US006973461B1

(12) United States Patent
Fleming, III et al.

(10) Patent No.: US 6,973,461 B1
(45) Date of Patent: Dec. 6, 2005

(54) METHOD AND APPARATUS FOR CONTROLLING REPRODUCTION OF AN AUDIOVISUAL WORK

(75) Inventors: Hoyt A. Fleming, III, Boise, ID (US); Paul A. Revis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/526,910

(22) Filed: Mar. 16, 2000

(51) Int. Cl.[7] .............................................. G06F 17/00
(52) U.S. Cl. .................. 707/104.1; 707/102; 707/101; 707/3; 386/94; 386/126
(58) Field of Search ............................ 707/517, 513, 707/103, 104.1, 102, 101; 709/206, 203; 704/260; 706/45; 386/46, 68, 94, 126

(56) References Cited

U.S. PATENT DOCUMENTS

| 5,434,678 | A | | 7/1995 | Abecassis |
| 5,589,945 | A | | 12/1996 | Abecassis |
| 5,598,276 | A | | 1/1997 | Cookson et al. |
| 5,634,849 | A | | 6/1997 | Abecassis |
| 5,664,046 | A | | 9/1997 | Abecassis |
| 5,691,972 | A | | 11/1997 | Tsuga et al. |
| 5,696,869 | A | | 12/1997 | Abecassis |
| 5,717,814 | A | | 2/1998 | Abecassis |
| 5,724,472 | A | | 3/1998 | Abecassis |
| 5,737,479 | A | | 4/1998 | Fujinami |
| 5,757,417 | A | | 5/1998 | Aras et al. |
| 5,828,786 | A | * | 10/1998 | Rao et al. ................. 348/415.1 |
| 5,900,908 | A | * | 5/1999 | Kirkland ..................... 348/461 |
| 5,913,013 | A | | 6/1999 | Abecassis |
| 6,138,147 | A | * | 10/2000 | Weaver et al. .............. 709/206 |
| 6,201,924 | B1 | * | 3/2001 | Crane et al. .................. 386/52 |
| 6,208,805 | B1 | * | 3/2001 | Abecassis .................... 386/126 |
| 6,289,165 | B1 | * | 9/2001 | Abecassis .................... 386/46 |
| 6,304,715 | B1 | * | 10/2001 | Abecassis .................... 386/126 |

OTHER PUBLICATIONS

U.S. Appl. No. 09/492,828, filed Jan. 27, 2000, Revis.
Taylor, Jim; DVD Demystified: The Guidebook for DVD-Video and DVC-ROM; ISBN 0-07-064841-7; 1.DVD Technology; I. Title; TK7882C56T39 1997.

* cited by examiner

Primary Examiner—Alford Kindred
Assistant Examiner—Sana Al-Hashemi
(74) Attorney, Agent, or Firm—Perkins Coie LLP

(57) ABSTRACT

Disclosed is a method and apparatus for building a database of content objectionable scenes of an audiovisual work, and a method and apparatus which uses the database to control reproduction of the work. The database may be stored on a server and made available to clients which control an audiovisual reproduction apparatus through a direct dial-up or Internet connection.

24 Claims, 3 Drawing Sheets

METHOD AND APPARATUS FOR CONTROLLING REPRODUCTION OF AN AUDIOVISUAL WORK

CROSS REFERENCE TO RELATED APPLICATION

This application contains material which is related to U.S. application Ser. No. 09/492,828, filed Jan. 27, 2000 and entitled "Video Review Apparatus and Method."

FIELD OF THE INVENTION

The present invention relates to a method and apparatus for controlling the reproduction of an audiovisual work based on program content.

DESCRIPTION OF THE RELATED ART

Many audiovisual works, such as movies and videos currently have a content "rating" which is used to control access to the work by minors. The movie ratings system in the United States has been determined by producers (distributors, dealers) voluntarily. According to the document "THE MOVIE BUSINESS BOOK, pp 396–406, 'THE VOLUNTARY MOVIE RATING SYSTEM'", the ratings are broken down into five categories of:

"G", General Audiences—All ages admitted;
"PG", Parental Guidance Suggested—Some material may not be suitable for children;
"PG-13", Parents strongly cautioned—Some material may be inappropriate for children under 13;
"R", Restricted, under 17—Requires accompanying parent or adult guardian; and
"NC-17"—No children under 17 admitted.

Therefore, in accordance with these assignments, entrance to a movie theater is restricted and selling or renting of a video tape, may likewise be restricted. Currently, one rating level is assigned to an entire movie, and this rating level is utilized for comparison with the ages of patrons of a movie theater or buyers/renters at a video shop. However, only small portions of the work may be the cause of a particular rating (e.g., scenes which contain violence, objectionable language, adult situations, nudity, etc.).

The current Digital Versatile Disk or Digital Video Disk (DVD) standard contains many features including a parental control feature. One method of parental control relies on a comparison of the rating of a DVD work with a parental control setting set at a DVD player. If the rating of the DVD work is higher (e.g., R is "higher" than PG-13, while PG-13 is "lower" than R) than that set at the DVD player, then the DVD will not play. Another method of parental control allows for different rated versions, e.g. G, PG, PG13, R, NC-17 of a movie to reside on a single DVD. The lower rated versions remove objectionable content from the higher rated versions. A parent can select a lower rated version for viewing by younger viewers. While this method is somewhat effective, it is well known that producers and directors of audiovisual works object to providing multiple versions of a work on a single DVD due to, e.g., the fact that it limits their creative freedom, and production costs are usually higher.

What is needed is a method and apparatus which allows a parent to edit a pre-existing rated work on a DVD by removing objectionable material or by replacing objectionable material with non-objectionable material to effectively create a lower rated version for viewing.

SUMMARY OF THE INVENTION

The present invention provides viewers, such as parents, with the ability to have a creative control over the playback of audiovisual work stored on a recording medium such as a DVD. The invention enables viewers to eliminate from a work those scenes which are found objectionable so that a DVD player only plays non-objectionable scenes.

The invention creates and uses a database containing pointers pointing to objectionable video frames in a particular DVD work. The database can be generated by the playing of a DVD work, and cataloging the violence and other objectionable content of the work and assigning a ratings level in association with identification of the video frame numbers containing the objectionable material. The beginning and ending of a scene containing objectionable content can be identified either by video frame numbers or a time stamp of the video frames. The database may be stored on a recording medium that is distinct from the DVD which may be a hard drive of a server accessible via the Internet or by a dial-up connection, or a removable storage medium such as a floppy disk or CD-ROM.

A viewer who desires to control reproduction of a DVD movie at a selected ratings level selects the desired ratings level for a DVD player. If the DVD recording medium contains that selected level of the work, then the DVD player plays back the selected ratings level version of the work. If the DVD recording medium does not contain a version of the work having the selected ratings level, then the DVD player accesses the database information, e.g., by accessing a server on the Internet, and downloads the pointers of the video frames containing the objectionable scenes into a controller for the DVD player. The DVD player then, under control of the information contained in the database, plays the audio visual work jumping past all objectionable scenes indicated by the database.

The database can contain pointers to those video frames which have non-objectionable scenes or to those video frames which have the objectionable scenes. In either case, the DVD player uses the database to reproduce only the non-objectionable scenes of the work based on the selected ratings level.

In one embodiment, the database can be created by someone within a household who previews audiovisual works for viewing by younger viewers within the household. This way, particular scenes could be marked for inclusion or removal in the playback of the audiovisual work as desired by the screener.

These and other features and advantages of the invention will be more readily understood from the following detailed description which is provided in connection with the accompanying drawings.

DETAILED DESCRIPTION

The present invention relies on the creation and use of a database which contains pointers to scenes of an audiovisual work which have objectionable content. Although the description below assumes that the database will contain pointers to scenes which have the objectionable content, it should be understood that the database can also be arranged to contain pointers to those scenes which do not have objectionable content therein, thereby indirectly indicating scenes which have the objectionable content.

Figure 1:
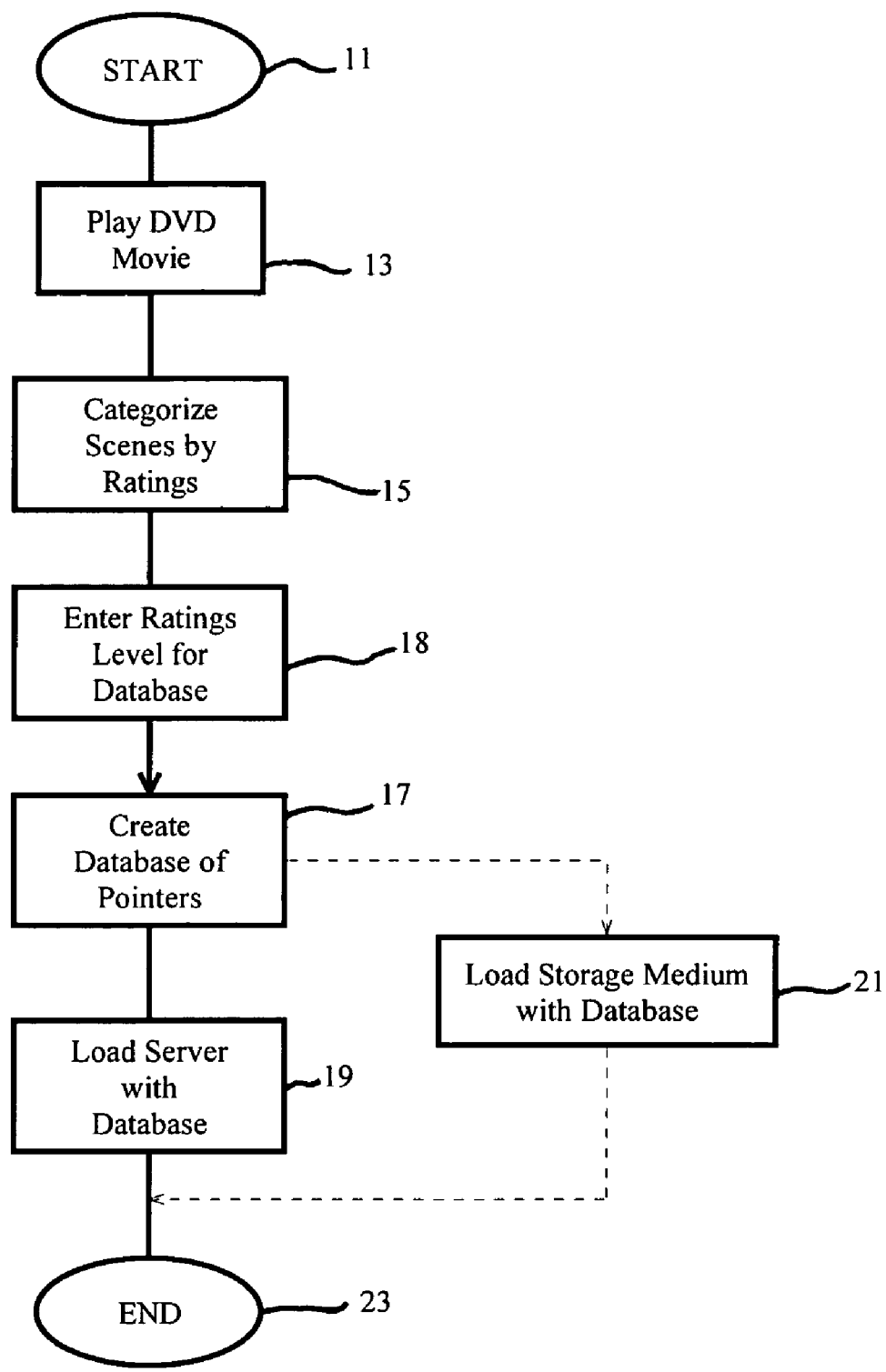
FIG. 1 illustrates in flowchart format a program which can be run on any general purpose computer, e.g., a personal computer, to create a database in accordance with the present invention.

The database can be built in accordance with the process flow indicated in FIG. 1. This process flow can be carried out on any general purpose computer, such as a personal computer. The process flow is started at a process segment 11, following which at segment 13 a DVD movie is played. As the DVD movie is played on a DVD player, individual scenes and/or portions of scenes of the movie are categorized by assigning a ratings level in process segment 15. It should be noted that each scene of an audio visual work may be rated in accordance with its content (e.g., nudity, language, violence, rape, etc.), and/or may be categorized by a ratings level. In addition, those selected scenes which are to be reviewed may be pre-identified on the work. For example, a reviewer may review those scenes which have been pre-identified with a particular ratings level. The rating levels applied can be those currently used for movie ratings, i.e., G, PG, PG-13, R, and NC-17, or some other rating system may be used.

Once all of the scenes, or only selected scenes, are rated at process segment 15, the process proceeds to process segment 18 wherein a particular ratings level for the database is entered by a reviewer. For example, a reviewer may decide to create a PG-13 ratings database for playback of the movie. Once the PG-13 ratings level has been entered at process segment 18, a database is created containing pointers for all scenes of the audiovisual work which either contain an identification of all scenes which have an objectionable ratings level above that entered at process segment 18, e.g., R, NC-17, or pointers to all scenes which have a non-objectionable ratings level, that is which have a ratings level equal to or below that entered at process segment 18, e.g., G, PG, PG-13. In either case the database will contain either directly or indirectly pointers which represent the objectionable scenes of the audiovisual work which are not to be contained in the playback. As noted, the pointers may be in the form of particular frame numbers which contain objectionable scenes, or a time stamp representing objectionable scenes.

Once the database is created at process segment 17, the process proceeds to process segment 21 wherein a storage medium is loaded with the database. The storage medium may be a hard drive on a client accessible server as indicated by process segment 19 or, alternatively, the database may be stored on a portable storage medium at process segment 21. The portable storage medium may be a floppy disk or a CD-ROM. Once the storage medium is loaded with the database, the processing ends at process segment 23. At this point, a database has been created on either a hard drive of a server (process segment 19) or on a portable medium (process segment 21).

If the database is stored on a hard drive of a server, it may now be accessed by either a client dial-up connection to the server or by a client connection to the server over the Internet. In either case, a playback apparatus for the audiovisual work associated with the client can access the database and use it to control reproduction of the audiovisual work. It should be noted that FIG. 1 process segments 15, 17 and 18 can all be carried out by any party including, e.g., a ratings organization, and the process is not limited to the source of the DVD, or the FIG. 1 process may be carried out by a screener within a household who is assigned to screen audiovisual works for younger household viewers. In the latter case, the database which is created at process segment 17 may be loaded on the hard drive of a local computer within the household which is connected to control an audiovisual reproduction unit, such as a DVD player.

As an example of one embodiment, a DVD is provided to an individual for free, the individual then rates and categorizes the DVD and uploads the database to a client on the Internet.

Figure 2:
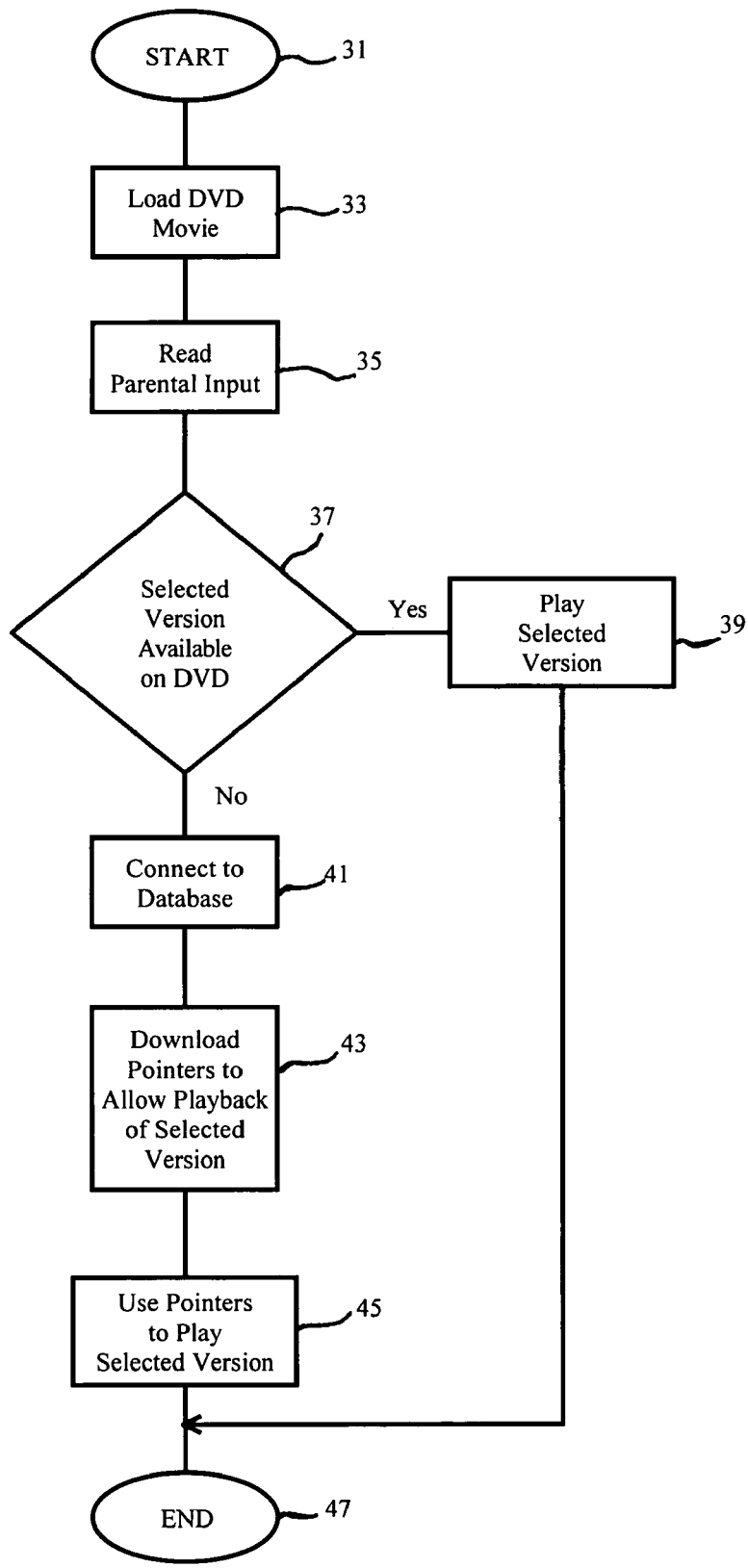
FIG. 2 is a flowchart of a program which can be run on any general purpose computer, e.g., a personal computer, for controlling playback of a DVD player.

Once the database has been created, it can be used by a controller which controls playback of an audiovisual work using the process illustrated in FIG. 2. The FIG. 2 process may be carried out on a general purpose computer which is coupled to an audiovisual playback device and which controls the playback device so that it only plays scenes as determined by the content of the database.

The process flow in FIG. 2 begins at process segment 31 and proceeds to process segment 33 where an audiovisual work, such as a DVD movie, is loaded into an audiovisual reproduction device. The reproduction device also accepts an input from a screener, such as a parent, indicating what ratings level is appropriate for the playback. In process segment 37, the DVD player looks at the audiovisual work on the recording medium to determine if a ratings level version of the work entered at process segment 35 is available on the recording medium. Assuming for the moment that the audiovisual work is a DVD movie, a DVD player is instructed to determine whether a version of the movie having the particular ratings level input at process segment 35 is available on the DVD recording medium. If it is, then the playback device proceeds to play the selected version at process segment 39, and the process ends at process segment 37.

If, in process segment 37, it is determined that there is no version of the audiovisual work on the recording medium which corresponds to the ratings level set in process segment 35, then the process proceeds to process segment 41 where a controller for the audiovisual reproduction device connects with the previously stored database. As noted, the database may be previously stored on a server on the Internet, in which case the controller for the audiovisual reproduction device establishes a connection to the server through the Internet and downloads the database. The database may also be available at the server through a dial-up connection, in which case the controller for the audiovisual work reproduction device establishes the dial-up connection and downloads the database. In either case, the database is downloaded into the controller for use in controlling the audiovisual work reproducing unit.

It is also possible that the database may reside on a portable computer medium (e.g., such a medium can be sold with a DVD or provided by a "rental" store) which is inserted into the controller, for example a personal computer, which controls the reproducing unit, in which case the database is directly read off the recording medium without the need to establish a connection to a server.

It should be noted that a recorded medium which contains the database may actually have a plurality of different databases, each associated with a respective ratings level. The database which is downloaded is that which corresponds to the ratings level input at process segment 35.

Once the database has been downloaded into the controller for the reproduction unit, the information in the database is used to control playback of the audiovisual work at process segment 45. That is, if the database contains direct pointers to those scenes which are objectionable, the audiovisual work reproduction device will play all scenes of the work except those indicated as objectionable.

On the other hand, if the database contains information indicating those scenes which are not objectionable, then those non-objectionable scenes will be directly played by the reproduction device and the process sequence illustrated in FIG. 2 ends at process segment 47.

Figure 3:
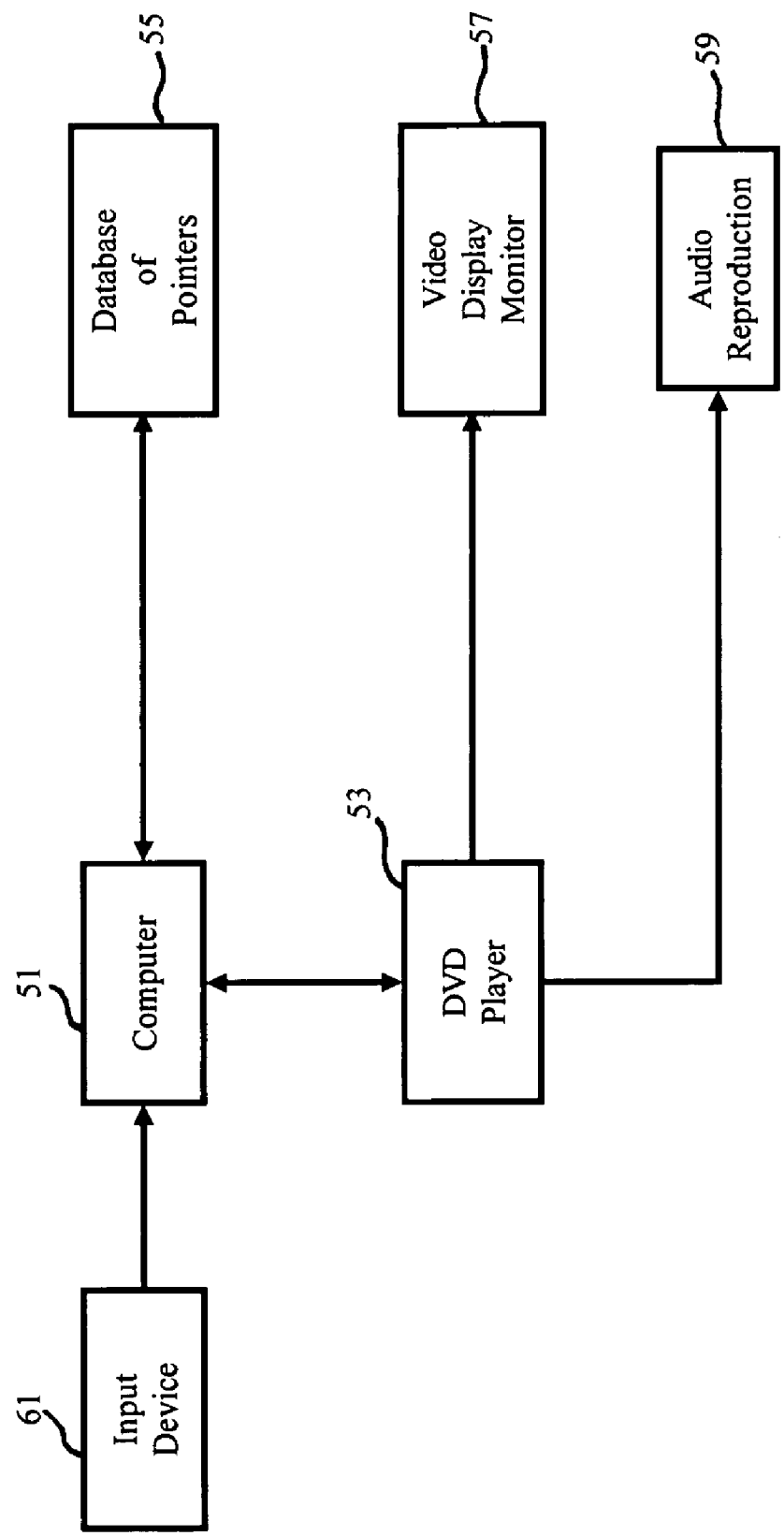
FIG. 3 is a block diagram of an apparatus, including a general purpose computer, which can be used to either create a database in accordance with the invention or to utilize the content of a database to control a DVD player in accordance with the invention.

FIG. 3 illustrates an apparatus which can be used to both create a database in accordance with the process illustrated in FIG. 1 and to control a reproducing unit with information contained within the database in accordance with the process illustrated in FIG. 2.

The apparatus illustrated at FIG. 3 includes a computer 51 which may be a personal computer or the like, which has an associated input device 61 such as a keyboard or mouse. The computer 51 is coupled to an audiovisual reproducing unit 53 shown in FIG. 3 as a DVD player. The DVD player in turn has outputs for a video display monitor 57 and an audio reproduction system 59 which may be implemented as independent units or may both form part of a television, computer or other device for reproducing the audio and visual information in an audiovisual work. The apparatus illustrated in FIG. 3 could be implemented as a personal computer which contains a DVD drive and which contains a modem or TCP/IP connection device for the Internet.

Computer 51 is shown as being coupled to a database 55. This database may be created by using the process illustrated in FIG. 1 above, in which case the database may reside on the hard drive of a server, or on a portable storage medium, or if the FIG. 3 apparatus itself is used to create the database, the database may reside on the hard drive of computer 51.

For reproduction, computer 51 accesses the database 55 whether on a computer server, its own hard drive, or on a portable storage medium, and implements the process shown in FIG. 2 to control playback of DVD player 53.

The invention provides an easy way for a screener to control those scenes of an audio visual work which are reproduced to thereby enable the screener to set a desired ratings level for the work for viewing by younger viewers, even when a version of the work having the desired ratings level is not available on the recording medium containing the work. The database may be created by the screener, or can be created by a separate screening entity which makes the database available for use during reproduction of an audiovisual work.

While the invention has been disclosed with reference to specific embodiments thereof, it should be apparent that many modifications, changes and substitutions can be made to the illustrated embodiments without departing from the spirit and scope of the invention. Accordingly, the invention is not to be construed as being limited by the foregoing description, but is only limited by the scope of the appended claims.

What is claimed as new and desired to be protected by Letters Patent of the United States is:

1. A method of controlling reproduction of an audiovisual work comprising:
    receiving rating input comprising a selection of one of a plurality of ratings choices;
    reviewing an audiovisual work on a first storage medium to determine if the first storage medium includes a rated version of the audiovisual work which bears a predetermined relationship to the rating input; and
    if the first storage medium includes the rated version, playing the rated version; and
    if the first storage medium does not include the rated version:
        accessing a database stored on a second storage medium, the database containing, for each of the plurality of ratings choices, a secondary database comprising information identifying at least a portion of a scene of the work having an assigned content ratings level which bears a predetermined relationship to the ratings choice; and
        reproducing scenes of the work in accordance with the information in the secondary database corresponding to the rating input.

2. A method as in claim 1, wherein the act of accessing includes reading the database from the second storage medium.

3. A method as in claim 1, wherein the second storage medium comprises a storage medium of a server and the act of accessing comprises establishing a connection to the server and downloading the secondary database corresponding to the rating input into a controller which controls reproduction of the work, the controller using the information in the downloaded secondary database to control reproduction of the work.

4. A method as in claim 1, wherein the act of accessing includes establishing a connection to an Internet server, whereby the connection is an Internet connection.

5. A method as in claim 1, wherein the act of accessing includes establishing a dial-up connection.

6. A method as in claim 1, wherein the act of accessing includes accessing a database containing data indicating which scenes of the work are to be reproduced.

7. A method as in claim 1, wherein the act of accessing includes accessing a database containing data indicating which scenes of the work are not to be reproduced.

8. A method as in claim 1, wherein receiving the rating input comprises receiving a screener's content ratings level.

9. A method as in claim 8, wherein the act of accessing includes accessing a database containing information identifying those scenes having a content ratings level which is less than or equal to the screener's content ratings level.

10. A method as in claim 8, wherein the act of accessing includes accessing a database containing information identifying those scenes having a content ratings level which is greater than the screener's content ratings level.

11. A method as in claim 1, wherein receiving the rating input comprises receiving a content ratings level from a screener.

12. A method of controlling reproduction of an audiovisual work on a playback apparatus including a controller, comprising:
    providing to the playback apparatus an audiovisual work prerecorded by a source on a first storage medium;
    establishing a connection to a server containing a database that is stored on a server storage medium that is different from the first storage medium, the database containing, for each of a plurality of ratings choices, a secondary database comprising information identifying a relationship between at least a portion of a scene of the work and the ratings choice, with each ratings choice having a content ratings level assigned by a screener who is a party other than the source;
    receiving ratings input specifying a ratings choice;

downloading into the controller of the playback apparatus the secondary database associated with the ratings choice specified in the ratings input; and reproducing scenes of the work with playback apparatus, the controller using the information in the downloaded secondary database to control reproduction of the work.

13. A method as in claim 12, wherein the server is an Internet server and the act of establishing a connection comprises establishing an Internet connection.

14. A method as in claim 12, wherein the act of downloading the secondary database comprises downloading a database containing information identifying those scenes having a content ratings level which is less than or equal to a playback content ratings level.

15. A method as in claim 12, wherein the act of downloading the secondary database comprises downloading a database containing information identifying those scenes having a content ratings level which is greater than a playback content ratings level.

16. A method as in claim 12, wherein the act of downloading the secondary database comprises downloading a database containing data indicating which scenes of the work are to be reproduced.

17. A method as in claim 12, wherein the act of downloading the secondary database comprises downloading a database containing data indicating which scenes of the work are not to be reproduced.

18. A method as in claim 12, wherein receiving the ratings input comprises receiving the ratings level input from a viewer.

19. A method as in claim 18, wherein the act of downloading the secondary database comprises downloading a database containing information identifying those scenes having a content ratings level which is less than or equal to the playback content ratings level.

20. A method as in claim 18, wherein the act of downloading the secondary database comprises downloading a database containing information identifying those scenes having a content ratings level which is greater than the playback content ratings level.

21. A method as in claim 18, wherein the viewer is the screener.

22. An apparatus for controlling reproduction of an audiovisual work, the apparatus comprising:

an audiovisual reproduction unit adapted to read from a prerecorded audiovisual medium an audiovisual work prerecorded by a source on the prerecorded audiovisual medium;

a ratings input adapted to receive information assigning an assigned content ratings level to at least a portion of the audiovisual work and to receive a playback content ratings level input by a viewer;

a connection to a server storage medium that is separate from the prerecorded audiovisual medium, the server storage medium including a database; and a controller coupled to the audiovisual reproduction unit, the viewer input, and the connection to the server, the controller being programmed to a) store the assigned content ratings level in the database via the connection to the server storage medium and b) control the audiovisual reproduction unit to reproduce only the portions of the audiovisual work which have an assigned content ratings level which bears a predetermined relationship to the playback content ratings level.

23. The apparatus of claim 22 wherein the server storage medium is on an Internet server and the connection to the server storage medium comprises an Internet connection.

24. An apparatus as in claim 22, wherein the database contains ratings level information for all scenes of the work.

* * * * *